Oct. 25, 1949.                  J. L. TERRY                    2,485,992
                     ARMATURE WEDGE DRIVER AND REMOVER
                           Filed Feb. 27, 1945
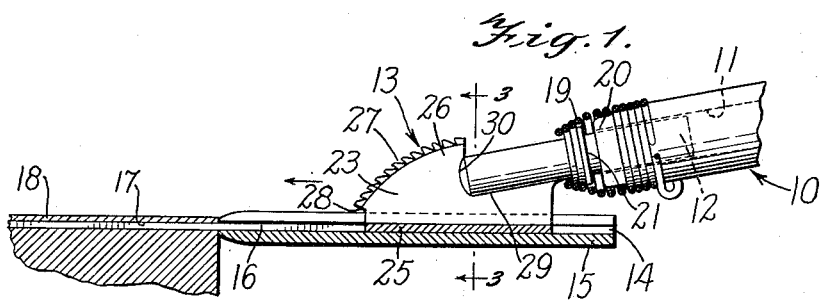
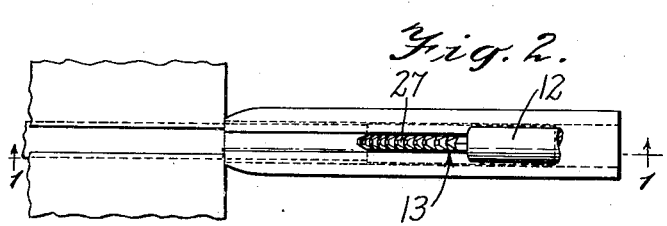
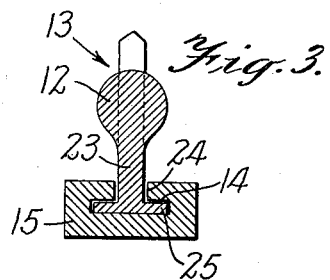
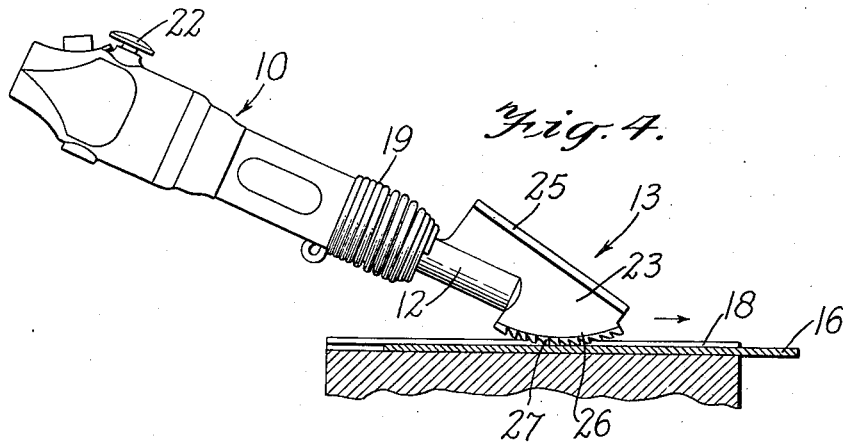
INVENTOR.
JOEL LESLIE TERRY
BY
Joseph V. Meigs
ATTORNEY Patented Oct. 25, 1949

2,485,992

UNITED STATES PATENT OFFICE 2,485,992

ARMATURE WEDGE DRIVER AND REMOVER

Joel Leslie Terry, Anderson, S. C., assignor to Buchanan Electrical Products Corporation, a corporation of New Jersey Application February 27, 1945, Serial No. 579,926

1 Claim. (Cl. 29—203)

This invention relates to a tool for installing or removing insulating wedges in or from the winding receiving slots of a rotor or stator.

Certain types of electric motors are characterized by rotors or stators or both which have parallel slots formed therein for the reception of the armature or field windings, as the case may be. After the windings have been placed in the slots it is necessary in many cases to close the open ends of the slots to protect the windings therein. For this purpose narrow dielectric strips or wedges are driven into the slots to cover the windings.

One manner of driving the wedges into place employs a guide by which the wedge can be aligned with the slot. The wedge is then engaged at its free end with a metal strip of approximately the same size as the wedge. The metal strip is then tapped with a hammer until the wedge is driven home. When it is desired to remove a wedge from its slot in the rotor or stator, it is driven therefrom by the metal strip. This method of wedge installation or removal has a number of drawbacks. It is difficult to hold the wedge guide and metal strip while tapping on the metal strip with a hammer. Also, as the metal strip is in most cases necessarily quite thin, and does not have accordingly sufficient rigidity to withstand hard blows from the hammer, only relatively light blows can be struck, making the period of complete installation over long. Also it is not physically possible to strike the metal strip more than a relatively few number of blows per unit of time.

It is accordingly among the objects of this invention to provide a tool with which wedges as described above may quickly and easily be installed in or removed from slots in a rotor or stator. Another object is to provide a tool of the above nature which is simple, inexpensive and rugged in construction, and which is readily usable by unskilled personnel. Other objects will be in part apparent, and in part pointed out hereinafter.

The invention accordingly consists in the features of construction, combinations of elements and arrangements of parts, as will be exemplified in the structure to be hereinafter described, and the scope of the application of which will be indicated in the following claim.

In the drawing, wherein I have shown one form of my invention,

Figure 1 is an elevation of the tool attached to a pneumatic hammer, a portion of the hammer being broken away and shown in section to illustrate the manner of attachment of the tool thereto;

Figure 2 is a fragmentary top plan view of the tool;

Figure 3 is a section taken along the line 3—3 of Figure 1; and

Figure 4 is another side elevation of the tool, but showing it in a different operative position.

Similar reference characters refer to similar parts throughout the views of the drawing.

Referring first to Figure 1, a pneumatic hammer, of a conventional type, is generally indicated at 10, the hammer being channeled as at 11 to receive the shank 12 of my tool, which is generally indicated at 13. As will be described in detail hereinbelow, the tool includes a portion adapted to slidably fit within the channel 14 of a guide 15 so that when the hammer is operated the tool drives a wedge 16 into a slot 17 formed in a rotor or stator 18.

Tool shank 12 has fastened thereto a spring 19 which may be threaded on the lower end 20 of hammer 10 to attach tool 13 to the hammer. Also fastened to the tool shank is a collar or the like 21 which, by reason of the tension of spring 19, is drawn against the end 20 of the hammer when the air pressure within the hammer drops. Thus when air is admitted to hammer 10, as by depression of a button 22, tool 13 is rapidly reciprocated by the hammer.

The body 23 of tool 13 is fastened in any convenient manner to the free end of shank 12 and, as shown in Figure 3, is relatively thin so as to permit of ready passage along a slot 24 in guide 15. On the bottom of tool body 23 is integrally formed an elongated flat plate 25 which lies at right angles to the body of the tool and has substantially the same cross sectional dimensions as wedge 16. Plate 25 is slightly smaller in cross section than slot 15 so as readily to slide therealong. The upper edge 26 of tool body 23 (Figure 1) is preferably curved, and a suitable number of teeth 27 are cut in this edge. The toothed portion of edge 26 terminates as at 28 slightly above plate or blade 25, so as to be well above the point of engagement between the blade and wedge 16 when the tool is being used to drive the wedge into rotor or stator 18.

While body 23 of tool 13 may be attached to shank 12 in any suitable manner, I have found it convenient to cut out the body as at 29, thus providing an abutment or shoulder 30 against which the end of shank 12 is set when the shank and body are attached as by welding or brazing. Thus the full effect of the impact from hammer 10 is transferred to tool body 23 and accordingly to wedge 16

In Figure 1, I have shown the tool being used to install a wedge in the rotor or stator. Thus wedge 16 is placed in guide 15, and the channel 14 of the guide is aligned with slot 17 in rotor 18. As the wedge is slightly shorter than the guide, there is a sufficient length of channel 14 at the right-hand end thereof to accommodate entrance of tool blade or plate 25. Thus the guide 15 may be held by one hand, while hammer 10 is held by the other. Upon depression of button 22 the pneumatic hammer causes tool blade 25 to strike rapid, repeated blows on the edge of wedge 16, driving the wedge quickly into its slot.

When it is desired to use the tool for the removal of the wedge, it is turned over, as shown in Figure 4, so that the serrations or teeth 27 on body 23 may be engaged with the top of wedge 16. Thus when the hammer 10 is operated, the teeth bite into the top of the wedge and accordingly grip it securely enough to transfer the hammer impacts so that the wedge may quickly and easily be driven out of its slot.

Thus it may be seen that I have provided a rotor or stator wedge installing or removing tool that attains the several objects set forth hereinabove in a thoroughly practical and efficient manner.

As many possible embodiments may be made of the above invention, and as many changes might be made in the embodiment above set forth, it is to be understood that all matter hereinbefore set forth or shown in the accompanying drawing is to be interpreted as illustrative and not in a limiting sense.

I claim:

A tool for removing an insulating wedge from a slot in a rotor or armature said tool comprising a rigid blade having an arcuate edge provided with saw tooth serrations, and a rigid shank integrally joined to said blade, one end of said shank terminating adjacent said edge, said shank having a diameter greater than the thickness of said blade and a longitudinal straight line axis angularly disposed in relation to the chord corresponding to said arcuate edge.

JOEL LESLIE TERRY.

REFERENCES CITED

The following references are of record in the file of this patent:

UNITED STATES PATENTS

| Number | Name | Date |
|---|---|---|
| 571,400 | Ruppert | Nov. 17, 1896 |
| 760,148 | Poppenhusen | May 17, 1904 |
| 1,356,810 | Cullin | Oct. 26, 1920 |
| 1,438,645 | Hill | Dec. 12, 1922 |
| 1,501,510 | Ahlers | July 15, 1924 |
| 1,645,101 | Gibb et al. | Oct. 11, 1927 |
| 1,679,884 | Thomas | Aug. 7, 1928 |
| 1,872,939 | Haddican | Aug. 23, 1932 |
| 1,902,551 | Frederickson | Mar. 21, 1933 |
| 2,176,626 | Gentry | Oct. 17, 1939 |